(12) United States Patent
Xiong et al.

(10) Patent No.: US 11,832,262 B2
(45) Date of Patent: Nov. 28, 2023

(54) UPLINK CONTROL INFORMATION (UCI) MULTIPLEXING ON MULTIPLE PHYSICAL UPLINK SHARED CHANNELS (PUSCHS)

(71) Applicant: APPLE INC., Cupertino, CA (US)

(72) Inventors: Gang Xiong, Portland, OR (US); Yushu Zhang, Beijing (CN); Guotong Wang, Beijing (CN)

(73) Assignee: APPLE INC., Cupertino, CA (US)

( * ) Notice: Subject to any disclaimer, the term of this patent is extended or adjusted under 35 U.S.C. 154(b) by 414 days.

(21) Appl. No.: 17/273,369

(22) PCT Filed: Sep. 3, 2019

(86) PCT No.: PCT/US2019/049370
§ 371 (c)(1),
(2) Date: Mar. 4, 2021

(87) PCT Pub. No.: WO2020/051152
PCT Pub. Date: Mar. 12, 2020

(65) Prior Publication Data
US 2021/0352655 A1 Nov. 11, 2021

Related U.S. Application Data

(60) Provisional application No. 62/728,629, filed on Sep. 7, 2018.

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0012* (2013.01); *H04W 72/02* (2013.01);
(Continued)

(58) Field of Classification Search
CPC . H04W 72/21; H04W 72/02; H04W 72/0446; H04W 72/0453; H04W 72/23;
(Continued)

(56) References Cited

U.S. PATENT DOCUMENTS

| 6,286,104 | B1 * | 9/2001 | Buhle | H04L 63/105 |
| | | | | 707/999.009 |
| 10,420,083 | B2 * | 9/2019 | Bendlin | H04L 5/0051 |

(Continued)

OTHER PUBLICATIONS

Ericsson, "On UCI Multiplexing on PUCCH", R1-1807251, 3GPP TSG RAN WG1 Meeting #93, Busan, South Korea, Agenda Item 7.1.3.2.1, May 21-25, 2018, 12 pages.
(Continued)

*Primary Examiner* — Brian T O Connor
(74) *Attorney, Agent, or Firm* — Dorsey & Whitney LLP

(57) ABSTRACT

Technology for a user equipment (UE) operable to multiplex uplink control information (UCI) on a physical uplink shared channel (PUSCH) is disclosed. The UE can determine a symbol duration of the PUSCH. The UE can select a UCI transmission rule in accordance with the symbol duration of the PUSCH when a physical uplink control channel (PUCCH) resource carrying UCI overlaps with more than one PUSCH resource in time within a PUCCH group. The UE can multiplex the UCI on a selected PUSCH resource from the more than one PUSCH resource in accordance with the UCI transmission rule.

20 Claims, 12 Drawing Sheets

(51) Int. Cl.
*H04W 72/02* (2009.01)
*H04W 72/0446* (2023.01)
*H04W 72/0453* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(58) Field of Classification Search
CPC ... H04L 5/0012; H04L 1/1671; H04L 1/1896; H04L 5/001; H04L 5/0053; H04L 1/16
See application file for complete search history.

(56) References Cited

U.S. PATENT DOCUMENTS

| | | | | |
|---|---|---|---|---|
| 10,966,223 B2* | 3/2021 | Kundu | | H04W 72/0446 |
| 11,071,097 B2* | 7/2021 | Choi | | H04W 72/21 |
| 11,178,648 B2* | 11/2021 | Takeda | | H04W 28/06 |
| 11,197,334 B2* | 12/2021 | Yi | | H04W 72/56 |
| 11,451,350 B2* | 9/2022 | Choi | | H04W 72/0453 |
| 11,510,249 B2* | 11/2022 | Irukulapati | | H04L 5/0051 |
| 11,516,633 B2* | 11/2022 | Lee | | H04W 72/23 |
| 11,646,771 B2* | 5/2023 | Li | | H04B 7/0456 370/329 |
| 11,646,834 B2* | 5/2023 | Wang | | H04L 1/1858 370/329 |
| 2017/0230917 A1 | 8/2017 | Ouchi et al. | | |
| 2020/0077424 A1* | 3/2020 | Baldemair | | H04L 27/2602 |

OTHER PUBLICATIONS

Huawei, Hisilicon, "Remaining issues on PUCCH structure in long-duration", R1-1805885, 3GPP TSG RAN WG1 Meeting #93, Busan, Korea, Agenda Item 7.1.3.2.2, May 21-25, 2018, 7 pages.
Intel Corporation, "Remaining details on NR PUCCH", R1-1808673, 3GPP TSG RAN WG1 Meeting #94, Gothenburg, Sweden, Agenda 7.1.3.2, Aug. 20-24, 2018, 6 pages.
PCT/US2019/049370, International Search Report and Written Opinion, dated Dec. 13, 2019, 8 pages.
Qualcomm Incorporated, "Maintenance for PUCCH", R1-1809427, 3GPP TSG RAN WG1 Meeting #94, Gothenburg, Sweden, Agenda Item 7.1.3.2, Aug. 20-24, 2018, 18 pages.

* cited by examiner

700 ⇘

> Decode, at the gNB, the UCI received from a user equipment (UE), wherein the UCI is multiplexed on a selected PUSCH resource from more than one PUSCH resource in accordance with a UCI transmission rule, wherein the UCI transmission rule is selected in accordance with a symbol duration of the PUSCH when a physical uplink control channel (PUCCH) resource carrying UCI overlaps with more than one PUSCH resource in time within a PUCCH group ⟶ 710

FIG. 7

UPLINK CONTROL INFORMATION (UCI) MULTIPLEXING ON MULTIPLE PHYSICAL UPLINK SHARED CHANNELS (PUSCHS)

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 7 depicts functionality of a Next Generation NodeB (gNB) operable to decode uplink control information (UCI) multiplexed on a physical uplink shared channel (PUSCH) in accordance with an example;

Figure 1:
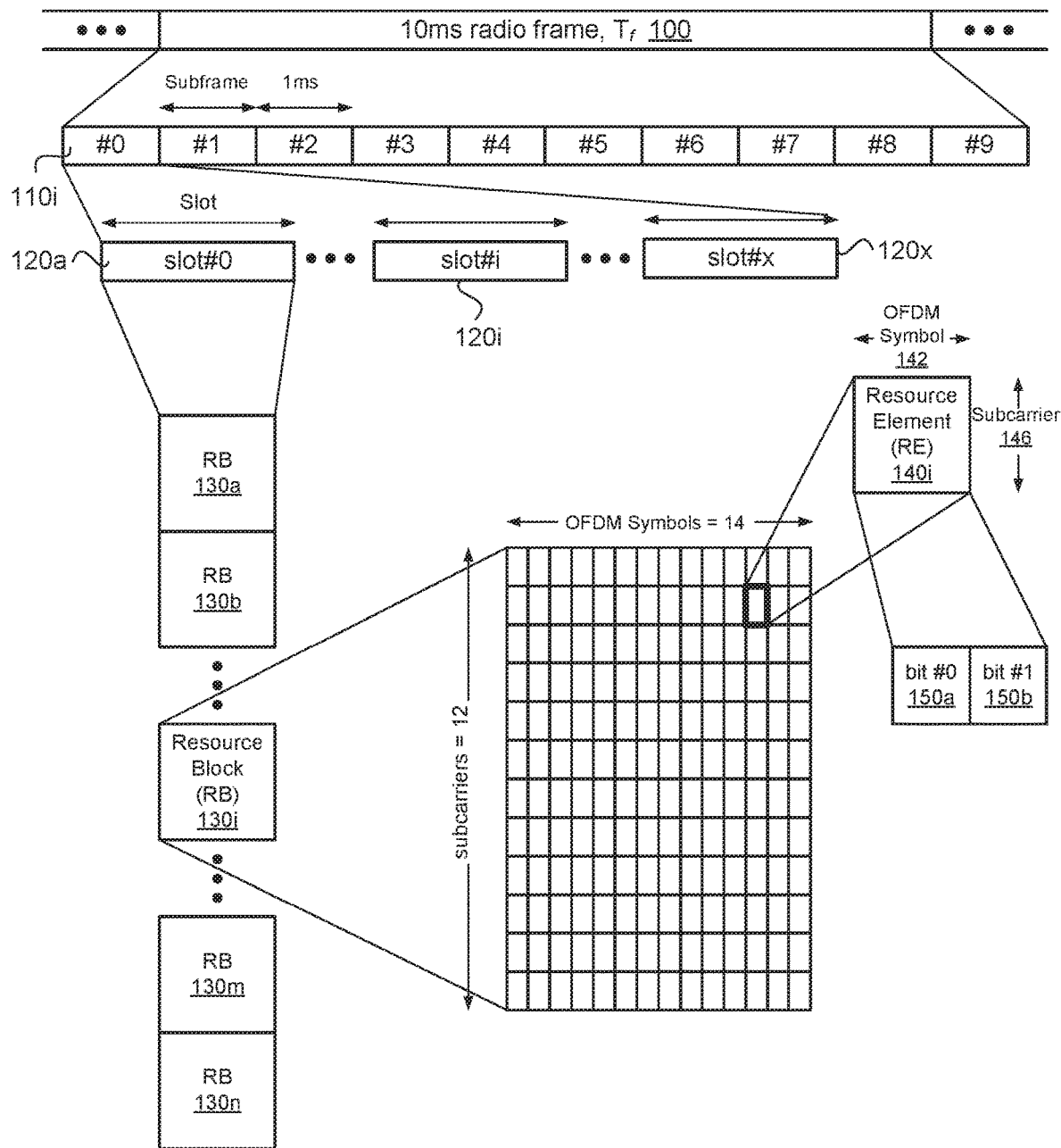
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$ of 1/μms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

Mobile communication has evolved significantly from early voice systems to today's highly sophisticated integrated communication platform. The next generation wireless communication system, 5G, or new radio (NR) will provide access to information and sharing of data by various users and applications. NR is expected to be a unified network/system that is targeted to meet different and sometime conflicting performance dimensions and services. Such diverse multi-dimensional specifications are driven by different services and applications. In general, NR will evolve based on 3GPP LTE-Advanced with additional potential new Radio Access Technologies (RATs) to enrich people's lives with better, simple and seamless wireless connectivity solutions. NR will enable everything connected by wireless and deliver fast, rich contents and services.

In NR, uplink control information (UCI) can be carried by a physical uplink control channel (PUCCH) or a physical uplink shared channel (PUSCH). In particular, UCI can include a scheduling request (SR), hybrid automatic repeat request—acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

In one example, when UCI is multiplexed on the PUSCH, the UCI may not be mapped on a demodulation reference signal (DM-RS) symbol associated with the PUSCH.

Figure 2:
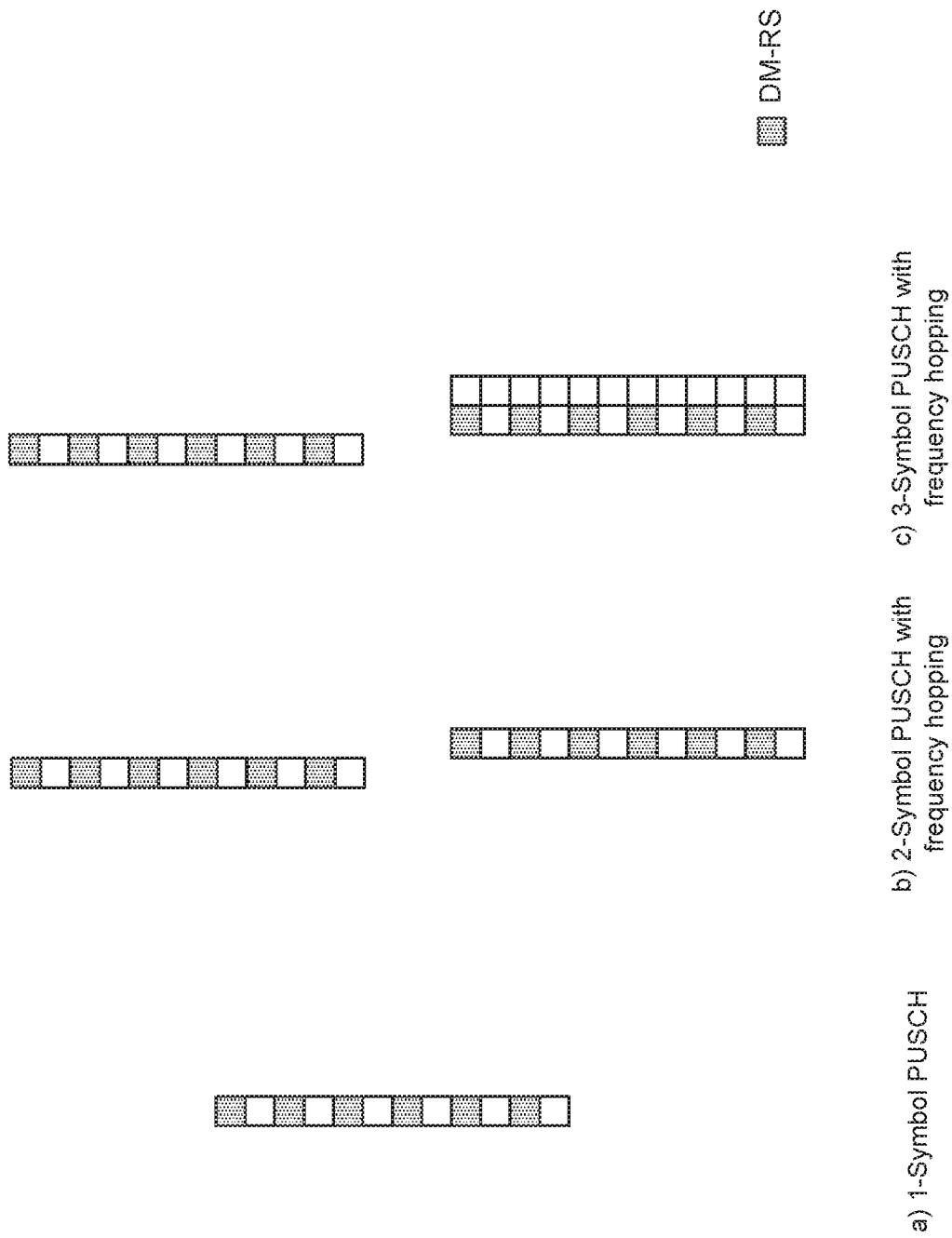
FIG. 2 illustrates uplink control information (UCI) multiplexing on a one, two or three symbol physical uplink shared channel (PUSCH) in accordance with an example.

FIG. 2 illustrates an example of UCI multiplexing on a one, two or three symbol PUSCH, e.g., 1-symbol PUSCH, or 2/3-symbol PUSCH with frequency hopping. For example, when the PUSCH only spans one symbol, or two or three symbols with frequency hopping, the UCI cannot be multiplexed on the PUSCH. Hence, certain mechanisms are to be defined to handle this issue.

In one example, in a PUCCH group, within one set of colliding physical uplink control channels (PUCCHs) or PUSCHs channels, when a determined PUCCH resource overlaps with one or multiple PUSCHs which satisfy timeline specifications for overlapped UL channels, a UE first determines a component carrier (CC) index for UCI multiplexing based on a procedure defined in 3GPP Technical Specification (TS) 38.213 V15.1.0. If there are multiple PUSCHs on the determined CC, the UE can multiplex the PUCCH on the PUSCH with an earliest starting symbol on that CC.

However, when the PUSCH spans one symbol, or two or three symbols with frequency hopping, the UCI may not be multiplexed on the PUSCH. This dropping rule can be applied for the case when one PUCCH overlaps with multiple PUSCHs in a slot and in case of carrier aggregation.

The present technology relates to techniques for UCI piggybacking on multiple PUSCHs with a short duration.

As mentioned above, when the UCI is multiplexed on the PUSCH, the UCI may not be mapped on the DM-RS symbol associated with the PUSCH transmission. However, for a 1-symbol PUSCH, or a 2/3-symbol PUSCH with frequency hopping, the UCI may not be multiplexed on the PUSCH. In case of carrier aggregation and when one PUCCH overlaps with more than one PUSCHs in a slot, the dropping rule can be extended to allow the UCI to piggyback on an appropriate PUSCH.

In one example, when a PUCCH carrying UCI overlaps with more than one PUSCHs in a PUCCH group, where more than one PUSCHs include both grant based PUSCH and configured grant PUSCH, and if a duration of the grant based PUSCH is greater than 1 symbols when frequency hopping is not enabled or is greater than K1 symbols when frequency hopping is enabled, the UCI can be piggybacked on the grant based PUSCH. Otherwise, the UCI can be piggybacked on the configured grant PUSCH. If both the grant based and configured grant PUSCHs span 1 symbol when frequency hopping is not enabled or less than K2 symbols when frequency hopping is not enabled, the UCI can be dropped without multiplexing on the PUSCH. In addition, K1 and K2 can be predefined in the 3GPP TS, e.g., K1=3 and K2=4.

Figure 3:
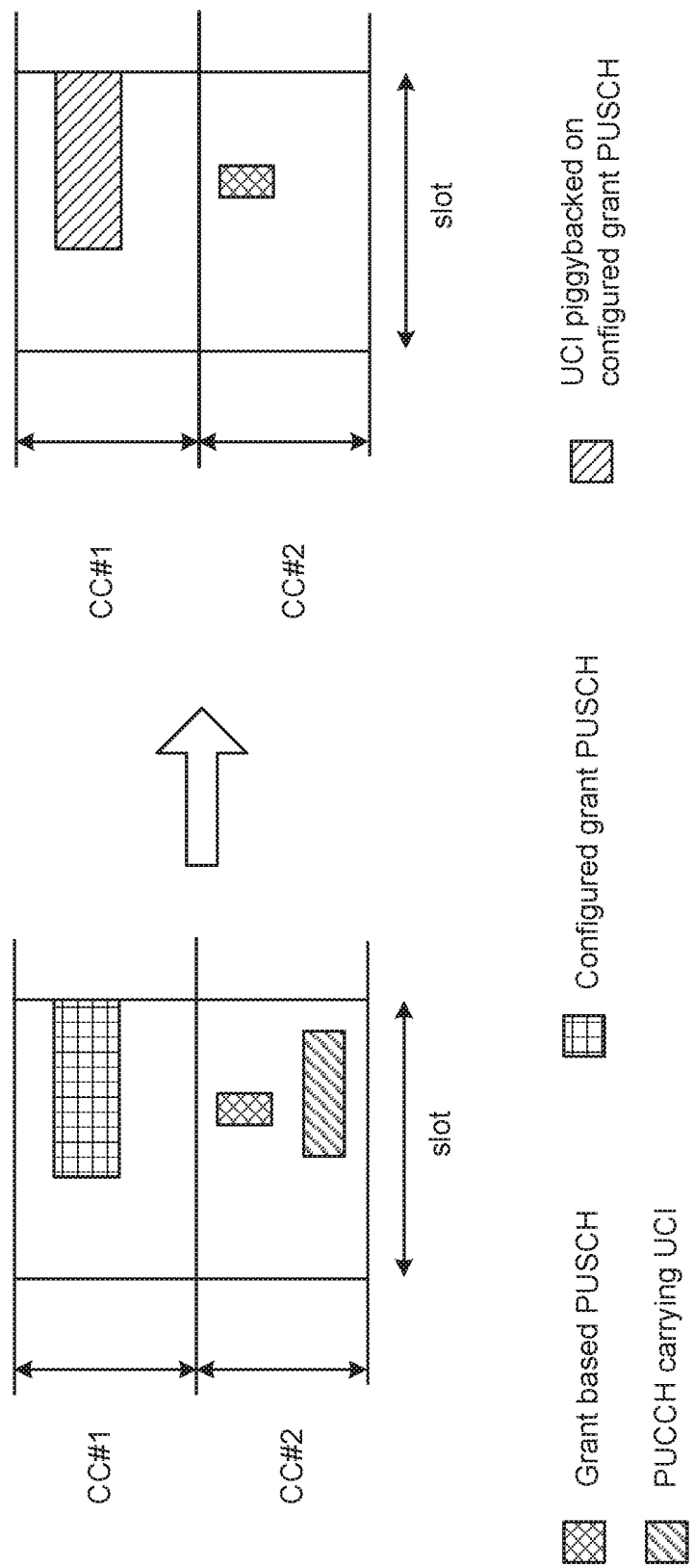
FIG. 3 illustrates UCI piggybacked on a configured grant PUSCH when a grant-based PUSCH spans one symbol in accordance with an example.

FIG. 3 illustrates an example of UCI piggybacked on a configured grant PUSCH when a grant-based PUSCH spans one symbol. In this example, two component carriers (CC) can be configured for a UE for carrier aggregation. Further, the grant based PUSCH can only span 1 symbol, while the configured grant PUSCH can span 10 symbols. In this case, the UCI can be piggybacked on the configured grant PUSCH instead of the grant based PUSCH.

In one configuration, if a UE transmits multiple PUSCHs in a slot on respective serving cells that include first PUSCHs that are scheduled by DCI format(s) 0_0 or DCI format(s) 0_1 and second PUSCHs configured by respective higher layer parameters ConfiguredGrantConfig, and if the first PUSCH duration is greater than 1 symbols when frequency hopping is not enabled or is greater than 3 symbols when frequency hopping is enabled, and the UE would multiplex the UCI in one of the multiple PUSCHs, and the multiple PUSCHs fulfil defined conditions for UCI multiplexing, the UE can multiplex the UCI in a PUSCH from the first PUSCHs. Otherwise, if the second PUSCH duration is greater than 1 symbols when frequency hopping is not enabled or greater than 3 symbols when frequency hopping is enabled, the UE can multiplex the UCI in a PUSCH from the second PUSCHs. Otherwise, if the first and second PUSCH duration is 1 symbol when frequency hopping is not enabled or less than 4 symbols when frequency hopping is enabled, the UE can drop the PUCCH and does not multiplex the UCI in a PUSCH from the first and second PUSCHs.

In one example, when the PUSCH collides with the PUCCH, where UCI cannot be multiplexed to the PUSCH, e.g., when the duration of PUSCHs that collides with the PUCCH is 1 symbol when frequency hopping is not enabled or less than K2 symbols, the UE can expect that a collision does not occur due to gNB scheduling.

In one example, in a PUCCH group when a PUCCH carrying a UCI overlaps with more than one PUSCHs in a slot, and if a timeline specification is satisfied, a UE can multiplex the UCI on a PUSCH with a smallest component carrier (CC) index, where a PUSCH duration is greater than 1 symbols when frequency hopping is not enabled or is greater than K1 symbols when frequency hopping is enabled.

Further, if the UE transmits more than one PUSCHs in the slot with the smallest CC index that fulfil the timeline specification for UCI multiplexing, the UE can multiplex the UCI in an earliest PUSCH that the UE can transmit in the slot, such that the PUSCH duration is greater than 1 symbols when frequency hopping is not enabled or is greater than K1 symbols when frequency hopping is enabled. In one example, when the duration of more than PUSCHs is 1 symbol when frequency hopping is not enabled or is less than K2 symbols when frequency hopping is enabled, the UCI can be dropped without multiplexing on the PUSCH.

Figure 4:
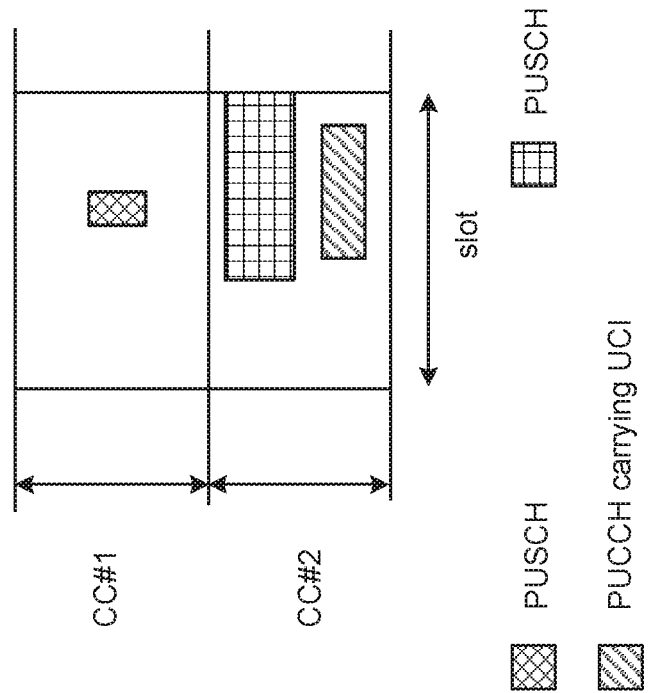
FIG. 4 illustrates UCI piggybacked on a PUSCH in a component carrier 2 (CC #2) with a 10-symbol duration in accordance with an example.

FIG. 4 illustrates an example of UCI piggybacked on a PUSCH in a component carrier 2 (CC #2) with a 10-symbol duration. In this example, two CCs can be configured for a UE for carrier aggregation. Further, the PUSCH in CC #1 can only span 1 symbol, while the PUSCH in CC #2 can span 10 symbols. In this case, the UCI can be piggybacked on the PUSCH in CC #2.

Figure 5:
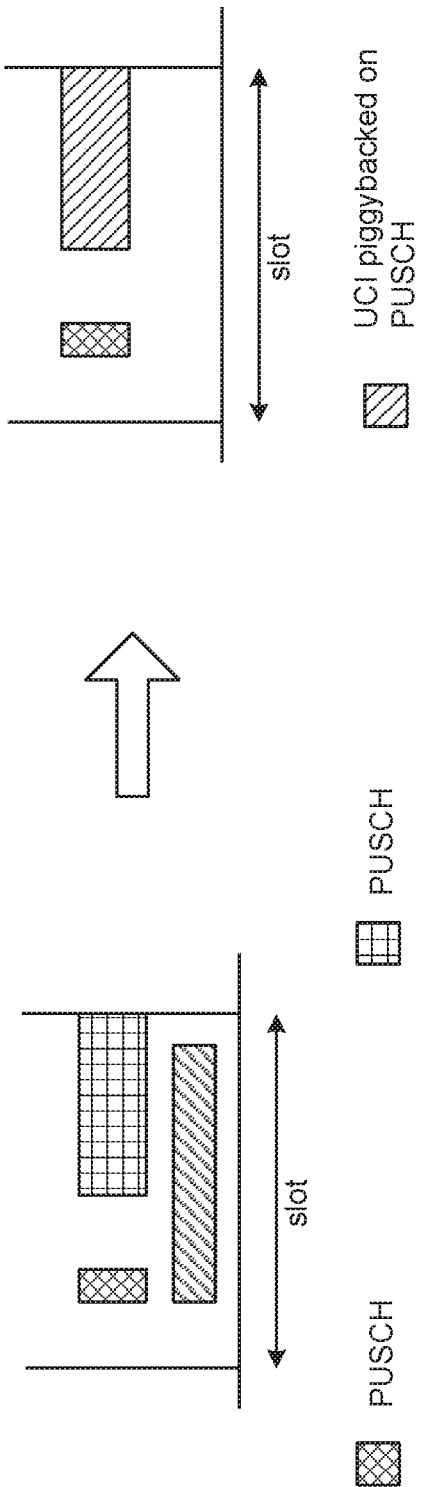
FIG. 5 illustrates UCI piggybacked on a second PUSCH with a 10-symbol duration in accordance with an example.

FIG. 5 illustrates an example of UCI piggybacked on a second PUSCH with a 10-symbol duration. In this example, a first PUSCH can only span 1 symbol, while the second PUSCH in the same slot can span 10 symbols. In this case, the UCI can be piggybacked on the second PUSCH.

In one example, when a UE transmits multiple PUSCHs in a slot on respective serving cells and the UE would multiplex UCI in one of the multiple PUSCHs and the UE does not multiplex aperiodic CSI in any of the multiple PUSCHs, the UE can multiplex the UCI in a PUSCH of the serving cell with a smallest ServCellIndex subject to defined conditions for UCI multiplexing being fulfilled, where the PUSCH duration is greater than 1 symbols when frequency hopping is not enabled or is greater than 3 symbols when frequency hopping is enabled. In another example, when the UE transmits more than one PUSCHs in the slot on the serving cell with the smallest ServCellIndex that fulfil defined conditions for UCI multiplexing, the UE can multiplex the UCI in the earliest PUSCH that the UE transmits in the slot, where the earliest PUSCH duration is greater than 1 symbols when frequency hopping is not enabled or is greater than 3 symbols when frequency hopping is enabled. If duration of all PUSCHs is 1 symbol when frequency hopping is not enabled or less than 4 symbols when frequency hopping is enabled, the UE can drop the PUCCH and does not multiplex the UCI in a PUSCH.

In one configuration, techniques for wireless communication in a fifth generation (5G) or new radio (NR) system are described. A UE can determine a physical uplink shared channel (PUSCH) transmission duration. The UE can determine a transmission rule in accordance with the PUSCH transmission duration when a physical uplink control channel (PUCCH) carrying uplink control information (UCI) overlaps with more than one PUSCH in a PUCCH group. The UE can piggyback the UCI on one PUSCH in accordance with the transmission rule.

In one example, when the PUCCH carrying UCI overlaps with more than one PUSCHs in a PUCCH group, where more than one PUSCHs include both a grant based PUSCH and a configured grant PUSCH, and if a duration of the grant based PUSCH is greater than 1 symbols when frequency hopping is not enabled or is greater than K1 symbols when frequency hopping is enabled, the UCI can be piggybacked on the grant based PUSCH. Otherwise, the UCI can be piggybacked on the configured grant PUSCH.

In one example, when both the grant based and configured grant PUSCHs span 1 symbol when frequency hopping is not enabled or less than K2 symbols when frequency hopping is not enabled, the UCI can be dropped without multiplexing on the PUSCH, where K1 and K2 can be predefined in the 3GPP TS, e.g., K1=3 and K2=4.

In one example, in a PUCCH group when the PUCCH carrying a UCI overlaps with more than one PUSCHs in a slot, and if a timeline specification is satisfied, the UE can multiplex the UCI on a PUSCH with a smallest component carrier (CC) index, where a PUSCH duration is greater than 1 symbols when frequency hopping is not enabled or is greater than K1 symbols when frequency hopping is enabled.

In one example, when the UE transmits more than one PUSCHs in the slot with the smallest CC index that fulfil the timeline specification for UCI multiplexing, the UE can multiplex the UCI in the earliest PUSCH that the UE transmits in the slot, such that the PUSCH duration is greater than 1 symbols when frequency hopping is not enabled or is greater than K1 symbols when frequency hopping is enabled.

In one example, when the duration of more than PUSCHs is 1 symbol when frequency hopping is not enabled or is less than K2 symbols when frequency hopping is enabled, the UCI can be dropped without multiplexing on the PUSCH.

Figure 6:
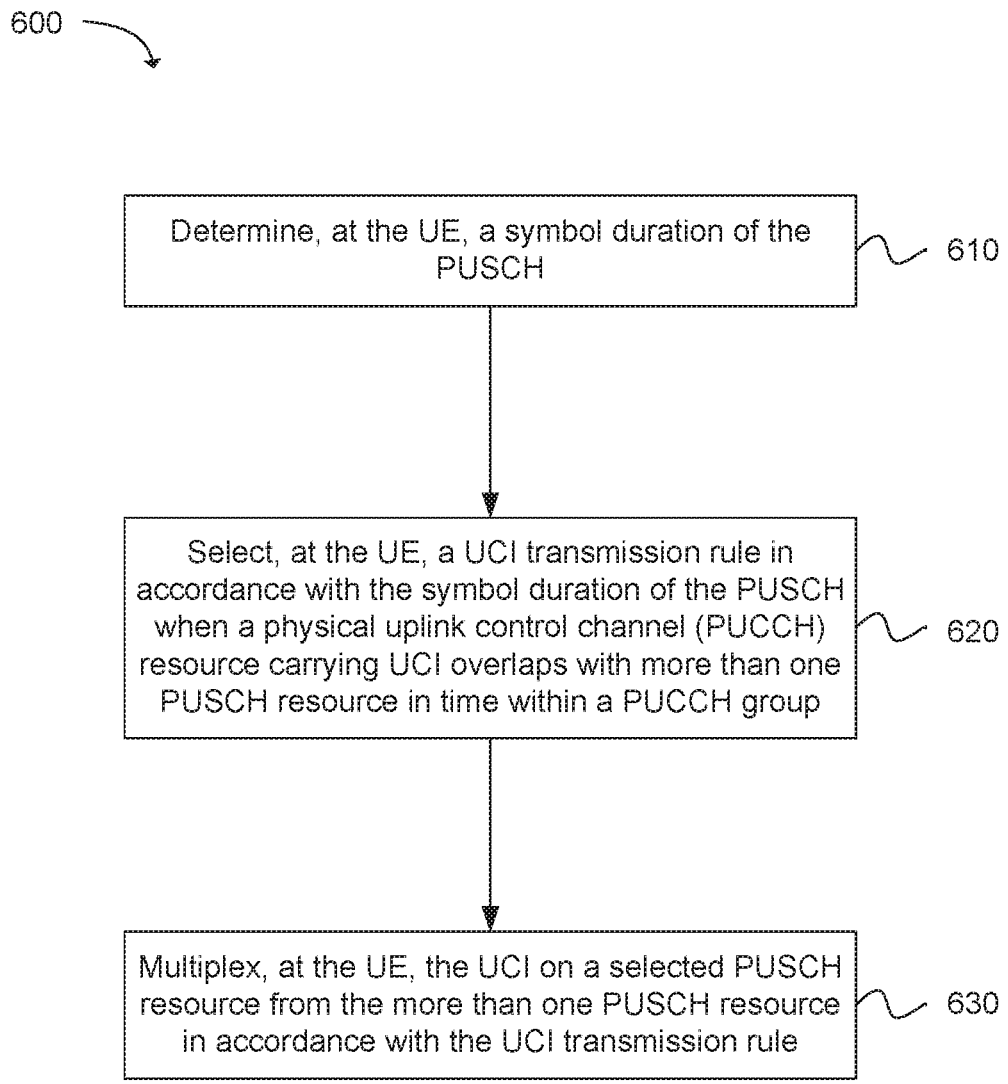
FIG. 6 depicts functionality of a user equipment (UE) operable to multiplex uplink control information (UCI) on a physical uplink shared channel (PUSCH) in accordance with an example.

Another example provides functionality 600 of a user equipment (UE) operable to multiplex uplink control information (UCI) on a physical uplink shared channel (PUSCH), as shown in FIG. 6. The UE can comprise one or more processors configured to determine, at the UE, a symbol duration of the PUSCH, as in block 610. The UE can comprise one or more processors configured to select, at the UE, a UCI transmission rule in accordance with the symbol duration of the PUSCH when a physical uplink control channel (PUCCH) resource carrying UCI overlaps with more than one PUSCH resource in time within a PUCCH group, as in block 620. The UE can comprise one or more processors configured to multiplex, at the UE, the UCI on a selected PUSCH resource from the more than one PUSCH resource in accordance with the UCI transmission rule, as in block 630. In addition, the UE can comprise a memory interface configured to send to a memory the selected UCI transmission rule.

Another example provides functionality 700 of a Next Generation NodeB (gNB) operable to decode uplink control information (UCI) multiplexed on a physical uplink shared channel (PUSCH), as shown in FIG. 7. The gNB can comprise one or more processors configured to decode, at the gNB, the UCI received from a user equipment (UE), wherein the UCI is multiplexed on a selected PUSCH resource from more than one PUSCH resource in accordance with a UCI transmission rule, wherein the UCI transmission rule is selected in accordance with a symbol duration of the PUSCH when a physical uplink control channel (PUCCH) resource carrying UCI overlaps with more than one PUSCH resource in time within a PUCCH group, and the symbol duration is less than or equal to K symbols, as in block 710. In addition, the gNB can comprise a memory interface configured to send to a memory the UCI.

Figure 8:
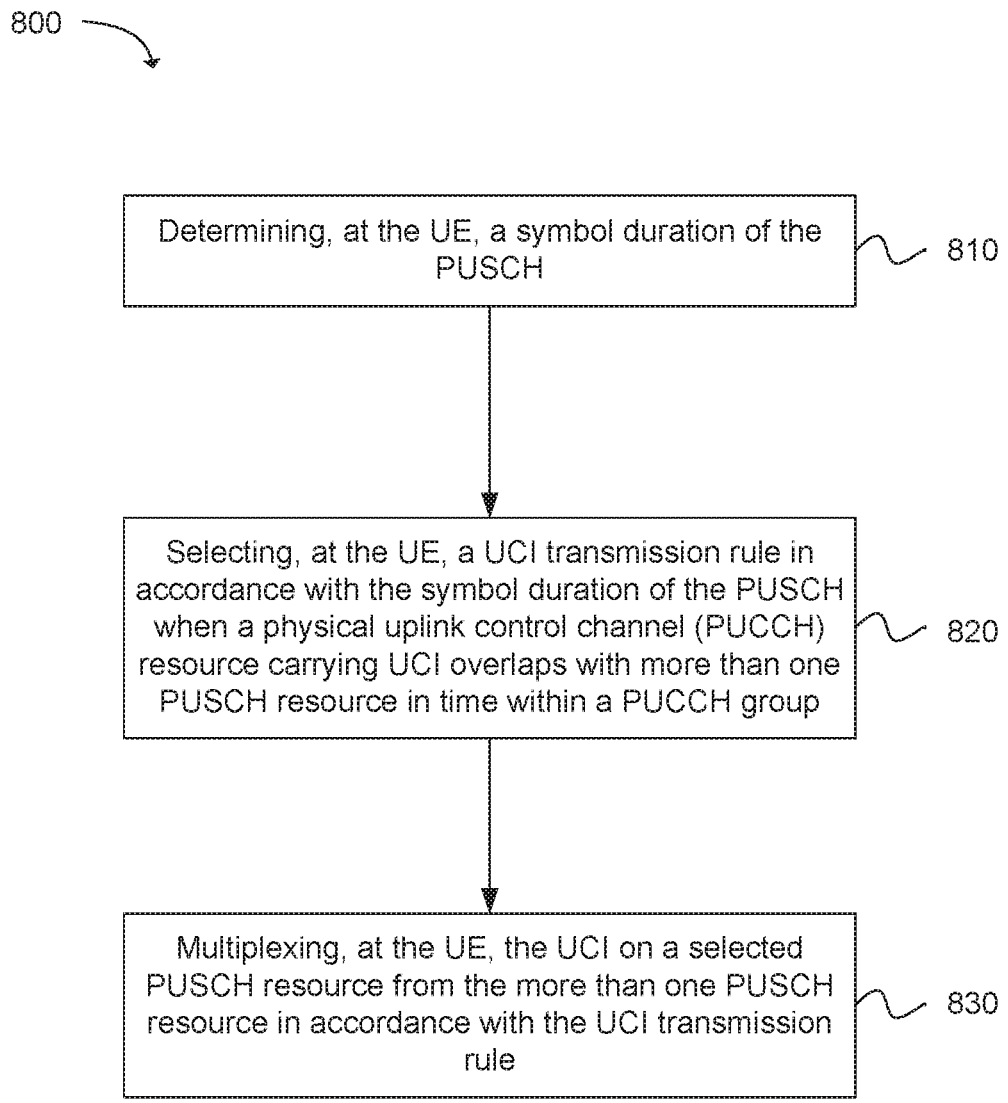
FIG. 8 depicts a flowchart of a machine readable storage medium having instructions embodied thereon for multiplexing uplink control information (UCI) on a physical uplink shared channel (PUSCH) at a user equipment (UE) in accordance with an example.

Another example provides at least one machine readable storage medium having instructions 800 embodied thereon for multiplexing uplink control information (UCI) on a physical uplink shared channel (PUSCH) at a user equipment (UE), as shown in FIG. 8. The instructions can be executed on a machine, where the instructions are included on at least one computer readable medium or one non-transitory machine readable storage medium. The instructions when executed by one or more processors of the UE perform: determining, at the UE, a symbol duration of the PUSCH, as in block 810. The instructions when executed by one or more processors of the UE perform: selecting, at the UE, a UCI transmission rule in accordance with the symbol duration of the PUSCH when a physical uplink control channel (PUCCH) resource carrying UCI overlaps with more than one PUSCH resource in time within a PUCCH group, as in block 820. The instructions when executed by one or more processors of the UE perform: multiplexing, at the UE, the UCI on a selected PUSCH resource from the more than one PUSCH resource in accordance with the UCI transmission rule, as in block 830.

Figure 9:
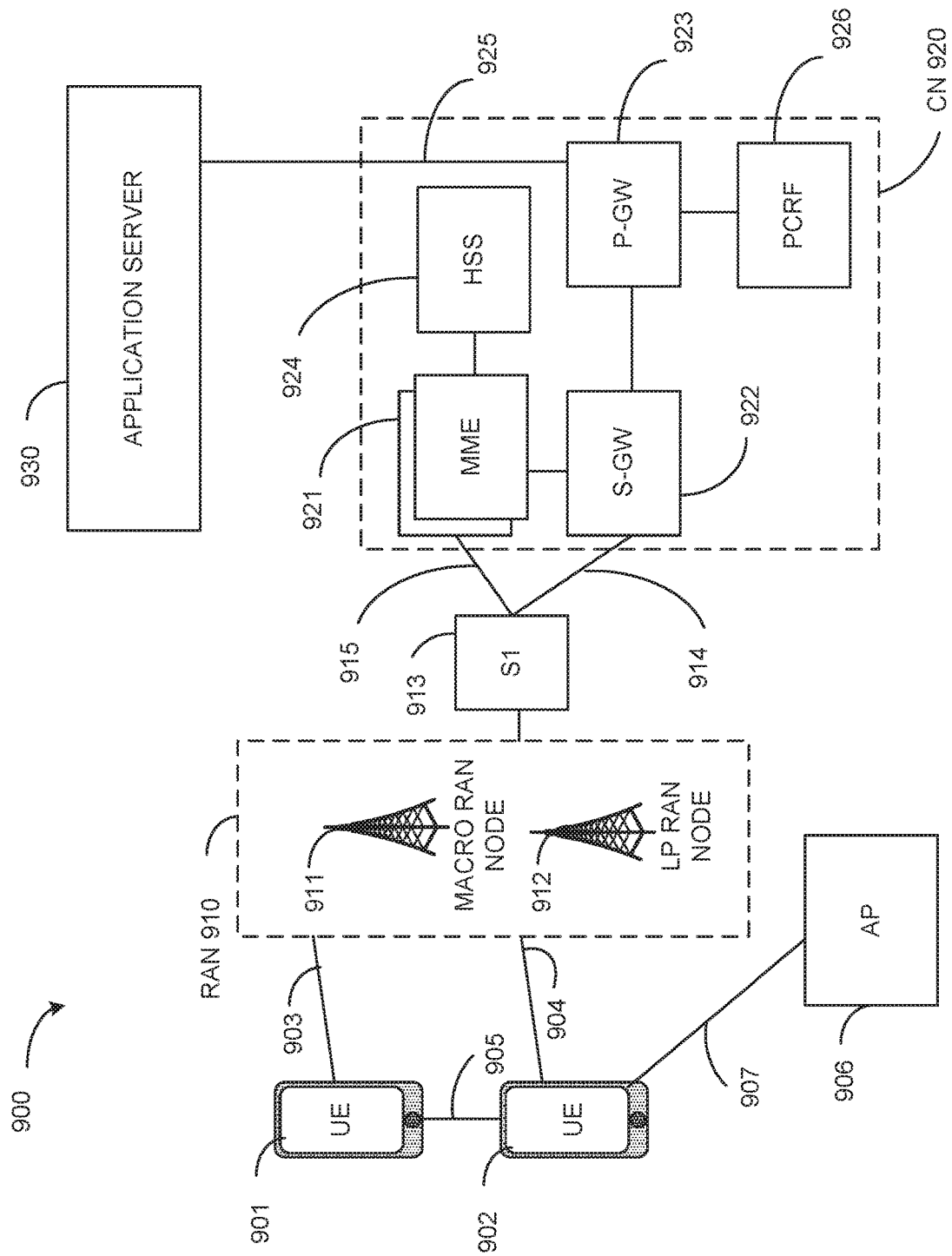
FIG. 9 illustrates an architecture of a wireless network in accordance with an example.

FIG. 9 illustrates an architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a NextGen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 901 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a NextGen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the 51 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the CN 920 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
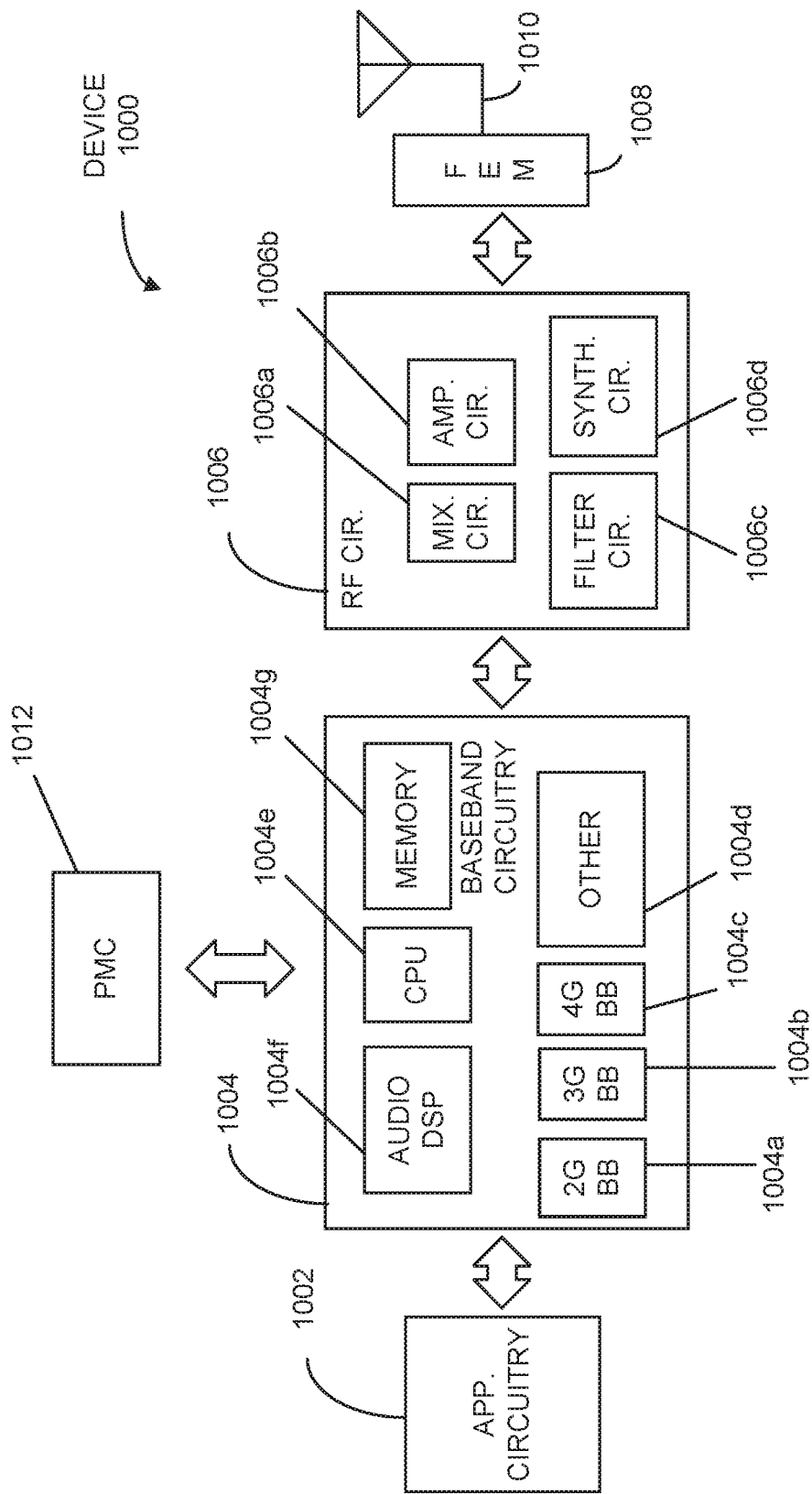
FIG. 10 illustrates a diagram of a wireless device (e.g., UE) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004*a*, a fourth generation (4G) baseband processor 1004*b*, a fifth generation (5G) baseband processor 1004*c*, or other baseband processor(s) 1004*d* for other existing generations, generations in development or to be developed in the future (e.g., second generation (2G), sixth generation (6G), etc.). The baseband circuitry 1004 (e.g., one or more of baseband processors 1004*a-d*) may handle various radio control functions that enable communication with one or more radio networks via the RF circuitry 1006. In other embodiments, some or all of the functionality of baseband processors 1004*a-d* may be included in modules stored in the memory 1004*g* and executed via a Central Processing Unit (CPU) 1004*e*. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004*f*. The audio DSP(s) 1004*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006*a*, amplifier circuitry 1006*b* and filter circuitry 1006*c*. In some embodiments, the transmit signal path of the RF circuitry 1006 may include filter circuitry 1006*c* and mixer circuitry 1006*a*. RF circuitry 1006 may also include synthesizer circuitry 1006*d* for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 10 12 may be additionally or alternatively coupled with, and perform similar power management operations for, other components such as, but not limited to, application circuitry 1002, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it must transition back to RRC_Connected state.

An additional power saving mode may allow a device to be unavailable to the network for periods longer than a paging interval (ranging from seconds to a few hours).

During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
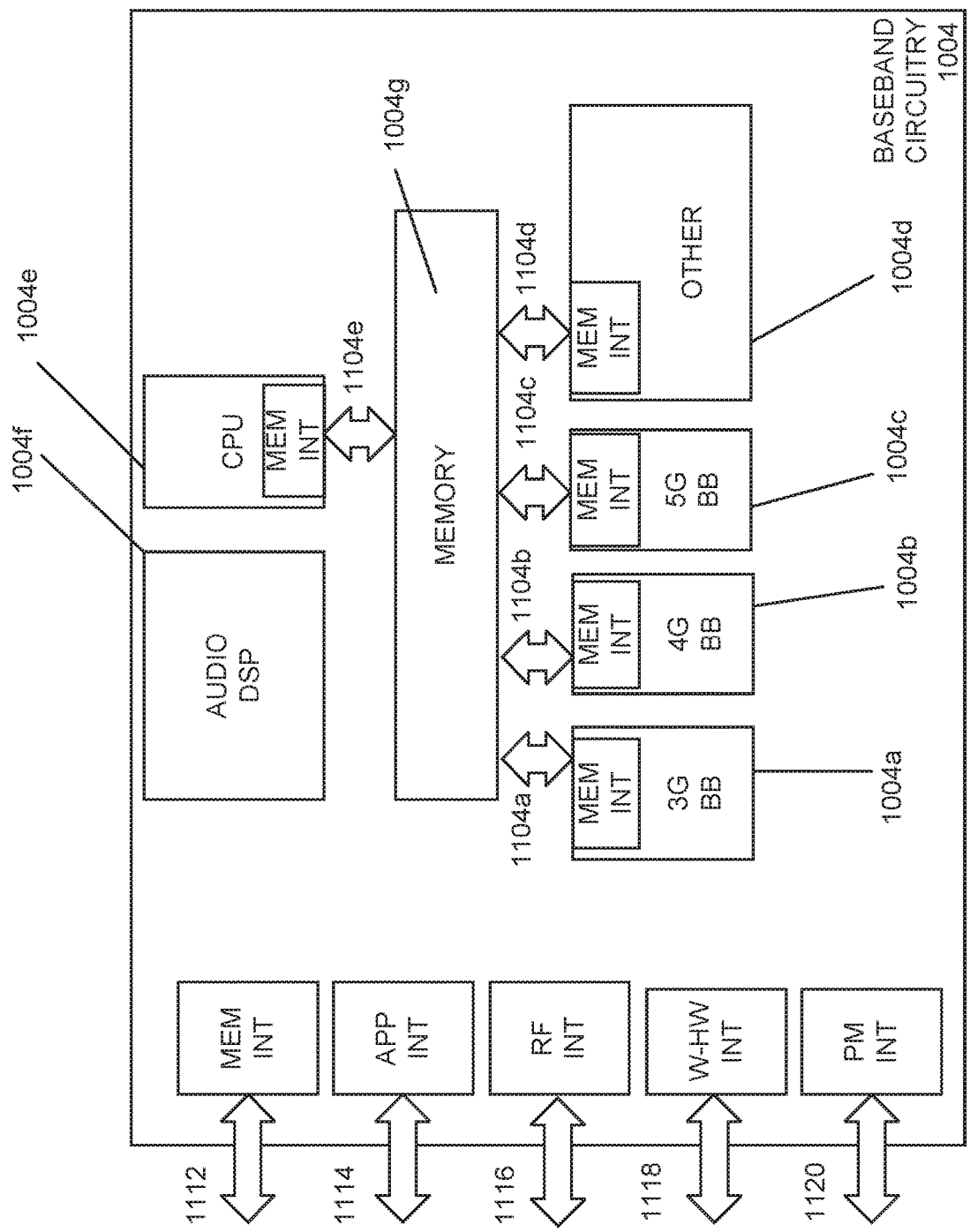
FIG. 11 illustrates interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004a-1004e and a memory 1004g utilized by said processors. Each of the processors 1004a-1004e may include a memory interface, 1104a-1104e, respectively, to send/receive data to/from the memory 1004g.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1120 (e.g., an interface to send/receive power or control signals to/from the PMC 1012.

Figure 12:
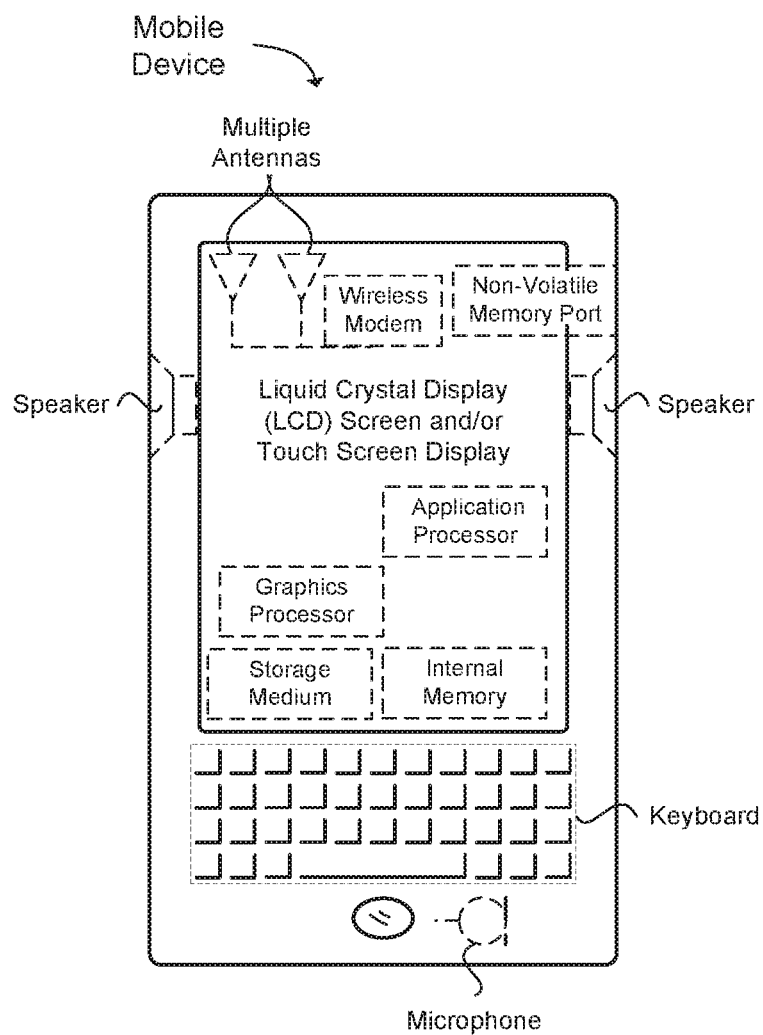
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to multiplex uplink control information (UCI) on a physical uplink shared channel (PUSCH), the apparatus comprising: one or more processors configured to: determine, at the UE, a symbol duration of the PUSCH; select, at the UE, a UCI transmission rule in accordance with the symbol duration of the PUSCH when a physical uplink control channel (PUCCH) resource carrying UCI overlaps with more than one PUSCH resource; and multiplex, at the UE, the UCI on a selected PUSCH resource from the more than one PUSCH resource in accordance with the UCI transmission rule; and a memory interface configured to send to a memory the selected UCI transmission rule.

Example 2 includes the apparatus of Example 1, further comprising a transceiver configured to: transmit the UCI using the selected PUSCH resource to a Next Generation NodeB (gNB).

Example 3 includes the apparatus of any of Examples 1 to 2, wherein the selected PUSCH resource is a grant based PUSCH resource when the symbol duration of the grant based PUSCH resource is greater than one symbol when frequency hopping is not enabled or greater than K1 symbols when frequency hopping is enabled, wherein K1 is a positive integer, and the UE multiplexes the UCI on the grant based PUSCH resource.

Example 4 includes the apparatus of any of Examples 1 to 3, wherein K1 is equal to 3 or 4.

Example 5 includes the apparatus of any of Examples 1 to 4, wherein the selected PUSCH resource is a configured grant PUSCH resource when the symbol duration of the grant based PUSCH resource is not greater than one symbol when frequency hopping is not enabled or not greater than K1 symbols when frequency hopping is enabled, wherein K1 is a positive integer, and the UE multiplexes the UCI on the configured grant PUSCH resource.

Example 6 includes the apparatus of any of Examples 1 to 5, wherein the PUSCH is one symbol, two symbols, three symbols or four symbols.

Example 7 includes the apparatus of any of Examples 1 to 6, wherein the one or more processors are configured to drop the UCI in accordance with the selected UCI transmission rule, wherein the more than one PUSCH resource includes a grant based PUSCH resource or a configured grant PUSCH resource, and the symbol duration of the grant based PUSCH resource and the configured grant PUSCH resource span one symbol when frequency hopping is not enabled or less than K2 symbols when frequency hopping is not enabled, wherein K2 is a positive integer.

Example 8 includes the apparatus of any of Examples 1 to 7, wherein K2 is equal to 5.

Example 9 includes the apparatus of any of Examples 1 to 8, wherein the one or more processors are configured to multiplex the UCI, based on the selected UCI transmission rule, on the selected PUSCH resource having a smallest component carrier (CC) index from the more than one PUSCH resource, where the PUCCH resource carrying the UCI overlaps with more than one PUSCH resource in a slot, and the symbol duration of the selected PUSCH resource is greater than one symbol when frequency hopping is not enabled or is greater than K1 symbols when frequency hopping is enabled, wherein K1 is a positive integer.

Example 10 includes the apparatus of any of Examples 1 to 9, wherein the one or more processors are configured to multiplex the UCI, based on the selected UCI transmission rule. on an earliest PUSCH resource in a slot in accordance with the selected UCI transmission rule when the UE transmits on more than one PUSCH in the slot with a smallest component carrier (CC) index that fulfills a timeline specification for UCI multiplexing, wherein the symbol duration of the earliest PUSCH resource is greater than one symbol when frequency hopping is not enabled or is greater than K1 symbols when frequency hopping is enabled, wherein K1 is a positive integer.

Example 11 includes the apparatus of any of Examples 1 to 10, wherein the one or more processors are configured to drop the UCI in accordance with the selected UCI transmission rule when the symbol duration of the more than one PUSCH resource is one symbol when frequency hopping is not enabled or less than K2 symbols when frequency hopping is enabled, wherein K2 is a positive integer.

Example 12 includes an apparatus of a Next Generation NodeB (gNB) operable to decode uplink control information (UCI) multiplexed on a physical uplink shared channel (PUSCH), the apparatus comprising: one or more processors configured to: decode, at the gNB, the UCI received from a user equipment (UE), wherein the UCI is multiplexed on a selected PUSCH resource from more than one PUSCH resource in accordance with a UCI transmission rule, wherein the UCI transmission rule is selected in accordance with a symbol duration of the PUSCH when a physical uplink control channel (PUCCH) resource carrying UCI overlaps with more than one PUSCH resource, and the symbol duration is less than or equal to 10 symbols, and a memory interface configured to send to a memory the UCI.

Example 13 includes the apparatus of Example 12, wherein the selected PUSCH resource is a grant based PUSCH resource when the symbol duration of the grant based PUSCH resource is greater than one symbol when frequency hopping is not enabled or greater than K1 symbols when frequency hopping is enabled, wherein K1 is a positive integer.

Example 14 includes the apparatus of any of Examples 12 to 13, wherein the selected PUSCH resource is a configured grant PUSCH resource when the symbol duration of the grant based PUSCH resource is not greater than one symbol when frequency hopping is not enabled or not greater than K1 symbols when frequency hopping is enabled, wherein K1 is a positive integer.

Example 15 includes the apparatus of any of Examples 12 to 14, wherein the PUSCH is one symbol, two symbols, three symbols or four symbols.

Example 16 includes at least one machine readable storage medium having instructions embodied thereon for multiplexing uplink control information (UCI) on a physical uplink shared channel (PUSCH) at a user equipment (UE), the instructions when executed by one or more processors at the UE perform the following: determining, at the UE, a symbol duration of the PUSCH; selecting, at the UE, a UCI transmission rule in accordance with the symbol duration of the PUSCH when a physical uplink control channel (PUCCH) resource carrying UCI overlaps with more than one PUSCH resource; and multiplexing, at the UE, the UCI on a selected PUSCH resource from the more than one PUSCH resource in accordance with the UCI transmission rule.

Example 17 includes the at least one machine readable storage medium of Example 16, wherein the selected PUSCH resource is a grant based PUSCH resource when the symbol duration of the grant based PUSCH resource is greater than one symbol when frequency hopping is not enabled or greater than K1 symbols when frequency hopping is enabled, wherein K1 is a positive integer, and the UE multiplexes the UCI on the grant based PUSCH resource.

Example 18 includes the at least one machine readable storage medium of any of Examples 16 to 17, wherein the selected PUSCH resource is a configured grant PUSCH resource when the symbol duration of the grant based PUSCH resource is not greater than one symbol when frequency hopping is not enabled or not greater than K1 symbols when frequency hopping is enabled, wherein K1 is a positive integer, and the UE multiplexes the UCI on the configured grant PUSCH resource.

Example 19 includes the at least one machine readable storage medium of any of Examples 16 to 18, further comprising instructions when executed perform the following: dropping the UCI in accordance with the selected UCI transmission rule, wherein the more than one PUSCH resource includes a grant based PUSCH resource or a configured grant PUSCH resource, and the symbol duration of the grant based PUSCH resource and the configured grant PUSCH resource span one symbol when frequency hopping is not enabled or less than K2 symbols when frequency hopping is not enabled, wherein K2 is a positive integer.

Example 20 includes the at least one machine readable storage medium of any of Examples 16 to 19, further comprising instructions when executed perform the following: multiplexing the UCI, based on the selected UCI transmission rule, on the selected PUSCH resource having a smallest component carrier (CC) index from the more than one PUSCH resource, where the PUCCH resource carrying the UCI overlaps with more than one PUSCH resource in a slot, and the symbol duration of the selected PUSCH resource is greater than one symbol when frequency hopping is not enabled or is greater than K1 symbols when frequency hopping is enabled, wherein K1 is a positive integer.

Example 21 includes the at least one machine readable storage medium of any of Examples 16 to 20, further comprising instructions when executed perform the following: multiplexing the UCI, based on the selected UCI transmission rule. on an earliest PUSCH resource in a slot in accordance with the selected UCI transmission rule when the UE transmits on more than one PUSCH in the slot with a smallest component carrier (CC) index that fulfills a timeline specification for UCI multiplexing, wherein the symbol duration of the earliest PUSCH resource is greater than one symbol when frequency hopping is not enabled or is greater than K1 symbols when frequency hopping is enabled, wherein K1 is a positive integer.

Example 22 includes the at least one machine readable storage medium of any of Examples 16 to 21, further comprising instructions when executed perform the following: dropping the UCI in accordance with the selected UCI transmission rule when the symbol duration of the more than one PUSCH resource is one symbol when frequency hopping is not enabled or less than K2 symbols when frequency hopping is enabled, wherein K2 is a positive integer.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a user equipment (UE) operable to multiplex uplink control information (UCI) on a physical uplink shared channel (PUSCH), the apparatus comprising:
one or more processors configured to:
determine, at the UE, a symbol duration of the PUSCH;
select, at the UE, a UCI transmission rule in accordance with the symbol duration of the PUSCH when a physical uplink control channel (PUCCH) resource carrying UCI overlaps with more than one PUSCH resource in time within a PUCCH group; and
multiplex, at the UE, the UCI on a selected PUSCH resource from the more than one PUSCH resource in accordance with the UCI transmission rule; and
a memory interface configured to send to a memory the selected UCI transmission rule.

2. The apparatus of claim 1, further comprising a transceiver configured to: transmit the UCI using the selected PUSCH resource to a base station.

3. The apparatus of claim 1, wherein the selected PUSCH resource is a grant based PUSCH resource when the symbol duration of the grant based PUSCH resource is greater than one symbol when frequency hopping is not enabled or greater than K1 symbols when frequency hopping is enabled, wherein K1 is a positive integer, and the UE multiplexes the UCI on the grant based PUSCH resource.

4. The apparatus of claim 3, wherein K1 is equal to 3 or 4.

5. The apparatus of claim 1, wherein the selected PUSCH resource is a configured grant PUSCH resource when the symbol duration of the grant based PUSCH resource is not greater than one symbol when frequency hopping is not enabled or not greater than K1 symbols when frequency hopping is enabled, wherein K1 is a positive integer, and the UE multiplexes the UCI on the configured grant PUSCH resource.

6. The apparatus of claim 1, wherein the PUSCH is one symbol, two symbols, three symbols or four symbols.

7. The apparatus of claim 1, wherein the one or more processors are configured to drop the UCI in accordance with the selected UCI transmission rule,
wherein the more than one PUSCH resource includes a grant based PUSCH resource or a configured grant PUSCH resource, and
the symbol duration of the grant based PUSCH resource and the configured grant PUSCH resource span one symbol when frequency hopping is not enabled or less than K2 symbols when frequency hopping is not enabled, wherein K2 is a positive integer.

8. The apparatus of claim 7, wherein K2 is equal to 5.

9. The apparatus of claim 1, wherein the one or more processors are configured to multiplex the UCI, based on the selected UCI transmission rule, on the selected PUSCH resource having a smallest component carrier (CC) index from the more than one PUSCH resource,
where the PUCCH resource carrying the UCI overlaps with more than one PUSCH resource in a slot in time within a PUCCH group, and
the symbol duration of the selected PUSCH resource is greater than one symbol when frequency hopping is not enabled or is greater than K1 symbols when frequency hopping is enabled, wherein K1 is a positive integer.

10. The apparatus of claim 1, wherein the one or more processors are configured to multiplex the UCI, based on the selected UCI transmission rule, on an earliest PUSCH resource in a slot in accordance with the selected UCI transmission rule when the UE transmits on more than one PUSCH in the slot with a smallest component carrier (CC) index that fulfills a timeline specification for UCI multiplexing,
wherein the symbol duration of the earliest PUSCH resource is greater than one symbol when frequency hopping is not enabled or is greater than K1 symbols when frequency hopping is enabled, wherein K1 is a positive integer.

11. The apparatus of claim 1, wherein the one or more processors are configured to drop the UCI in accordance with the selected UCI transmission rule when the symbol duration of the more than one PUSCH resource is one symbol when frequency hopping is not enabled or less than K2 symbols when frequency hopping is enabled, wherein K2 is a positive integer.

12. An apparatus of a base station operable to decode uplink control information (UCI) multiplexed on a physical uplink shared channel (PUSCH), the apparatus comprising:
one or more processors configured to:
decode, at the base station, the UCI received from a user equipment (UE), wherein the UCI is multiplexed on a selected PUSCH resource from more than one PUSCH resource in accordance with a UCI transmission rule,
wherein the UCI transmission rule is selected in accordance with a symbol duration of the PUSCH when a physical uplink control channel (PUCCH) resource carrying UCI overlaps with more than one PUSCH resource in time within a PUCCH group, and
a memory interface configured to send to a memory the UCI.

13. The apparatus of claim 12, wherein the selected PUSCH resource is a grant based PUSCH resource when the symbol duration of the grant based PUSCH resource is greater than one symbol when frequency hopping is not enabled or greater than K1 symbols when frequency hopping is enabled, wherein K1 is a positive integer.

14. The apparatus of claim 12, wherein the selected PUSCH resource is a configured grant PUSCH resource when the symbol duration of the grant based PUSCH resource is not greater than one symbol when frequency hopping is not enabled or not greater than K1 symbols when frequency hopping is enabled, wherein K1 is a positive integer.

15. The apparatus of claim 12, wherein the PUSCH is one symbol, two symbols, three symbols or four symbols.

16. At least one non-transitory machine readable storage medium having instructions embodied thereon for multiplexing uplink control information (UCI) on a physical uplink shared channel (PUSCH) at a user equipment (UE), the instructions when executed by one or more processors at the UE perform the following:
    determining, at the UE, a symbol duration of the PUSCH;
    selecting, at the UE, a UCI transmission rule in accordance with the symbol duration of the PUSCH when a physical uplink control channel (PUCCH) resource carrying UCI overlaps with more than one PUSCH resource; and
    multiplexing, at the UE, the UCI on a selected PUSCH resource from the more than one PUSCH resource in accordance with the UCI transmission rule.

17. The at least one non-transitory machine readable storage medium of claim 16, wherein the selected PUSCH resource is a grant based PUSCH resource when the symbol duration of the grant based PUSCH resource is greater than one symbol when frequency hopping is not enabled or greater than K1 symbols when frequency hopping is enabled, wherein K1 is a positive integer, and the UE multiplexes the UCI on the grant based PUSCH resource.

18. The at least one non-transitory machine readable storage medium of claim 16, wherein the selected PUSCH resource is a configured grant PUSCH resource when the symbol duration of the grant based PUSCH resource is not greater than one symbol when frequency hopping is not enabled or not greater than K1 symbols when frequency hopping is enabled, wherein K1 is a positive integer, and the UE multiplexes the UCI on the configured grant PUSCH resource.

19. The at least one non-transitory machine readable storage medium of claim 16, further comprising instructions when executed perform the following: dropping the UCI in accordance with the selected UCI transmission rule,
    wherein the more than one PUSCH resource includes a grant based PUSCH resource or a configured grant PUSCH resource, and
    the symbol duration of the grant based PUSCH resource and the configured grant PUSCH resource span one symbol when frequency hopping is not enabled or less than K2 symbols when frequency hopping is not enabled, wherein K2 is a positive integer.

20. The at least one non-transitory machine readable storage medium of claim 16, further comprising instructions when executed perform the following: multiplexing the UCI, based on the selected UCI transmission rule, on the selected PUSCH resource having a smallest component carrier (CC) index from the more than one PUSCH resource,
    where the PUCCH resource carrying the UCI overlaps with more than one PUSCH resource in a slot, and
    the symbol duration of the selected PUSCH resource is greater than one symbol when frequency hopping is not enabled or is greater than K1 symbols when frequency hopping is enabled.

* * * * *